US011110863B2

(12) United States Patent
Mendoza Vicioso

(10) Patent No.: US 11,110,863 B2
(45) Date of Patent: Sep. 7, 2021

(54) CONNECTOR ARRANGEMENT FOR A MOTOR VEHICLE REAR-VIEW MIRROR

(71) Applicant: Ficomirrors, S.A.U., Barcelona (ES)

(72) Inventor: Jose Mendoza Vicioso, La Roca del Vallès (ES)

(73) Assignee: FICOMIRRORS, S.A.U., Barcelona (ES)

( * ) Notice: Subject to any disclaimer, the term of this patent is extended or adjusted under 35 U.S.C. 154(b) by 0 days.

(21) Appl. No.: 16/274,914

(22) Filed: Feb. 13, 2019

(65) Prior Publication Data
US 2019/0248291 A1  Aug. 15, 2019

(30) Foreign Application Priority Data

Feb. 13, 2018 (EP) .................................... 18382081

(51) Int. Cl.
| | | |
|---|---|---|
| *B60R 1/076* | (2006.01) | |
| *B60R 1/06* | (2006.01) | |
| *B60R 1/074* | (2006.01) | |

(52) U.S. Cl.
CPC ............ *B60R 1/076* (2013.01); *B60R 1/0617* (2013.01); *B60R 1/074* (2013.01)

(58) Field of Classification Search
CPC ....... B60R 1/076; B60R 1/0617; B60R 1/074; B60R 1/06; B60R 1/006; B60R 1/007; B60R 1/02; F16B 5/0092; F16B 5/10; F16B 12/2009; F16B 7/20; F16B 21/04; F16L 37/24; E21B 17/046; Y10T 403/7007
See application file for complete search history.

(56) References Cited

U.S. PATENT DOCUMENTS

| | | | | |
|---|---|---|---|---|
| 5,035,398 A | * | 7/1991 | Chiang | ................. F04D 29/602 248/674 |
| 5,088,679 A | * | 2/1992 | Ogasawara | ............. B60R 1/074 248/479 |
| 7,887,202 B1 | * | 2/2011 | Peterson | ................. B60R 1/074 359/841 |

(Continued)

FOREIGN PATENT DOCUMENTS

| | | |
|---|---|---|
| DE | 102014104348 A1 | 10/2015 |
| JP | 2008254544 A | 10/2008 |

OTHER PUBLICATIONS

Extended European Search Report for European Application No. 18382081.0; Date of Completion: Jun. 4, 2018; dated Jun. 13, 2018; 6 pages.

*Primary Examiner* — Christopher Garft
(74) *Attorney, Agent, or Firm* — Cantor Colburn LLP

(57) ABSTRACT

A connector arrangement for a motor vehicle rear-view mirror includes a bayonet type connector, a mirror head support, and a fixing member. The bayonet type connector includes a coupling member having a first portion, and a base bracket having a second portion and adapted to attach to the motor vehicle. The mirror head support is mounted to the base bracket. The coupling member is engaged to the mirror head support and the base bracket. The fixing member is located in the first and second portions, and is adapted to be inserted into the second portion from the first portion and towards the base bracket. Insertion of the fixing member prevents rotation of the coupling member with respect to the base bracket and about a center axis.

11 Claims, 5 Drawing Sheets

(56) References Cited

U.S. PATENT DOCUMENTS

| | | | | |
|---|---|---|---|---|
| 2003/0086188 A1* | 5/2003 | Hayashi | ............... | B60R 1/074 |
| | | | | 359/871 |
| 2005/0103971 A1* | 5/2005 | Van Stiphout | ......... | B60R 1/076 |
| | | | | 248/479 |
| 2007/0242373 A1* | 10/2007 | Yamauchi | ............... | B60R 1/06 |
| | | | | 359/841 |
| 2009/0086351 A1* | 4/2009 | Sakata | ............... | B60R 1/076 |
| | | | | 359/872 |
| 2009/0244743 A1* | 10/2009 | Mendoza Vicioso | ... | B60R 1/072 |
| | | | | 359/872 |
| 2010/0296185 A1* | 11/2010 | Itoh | ............... | B60R 1/076 |
| | | | | 359/841 |
| 2011/0228412 A1* | 9/2011 | Sakata | ............... | B60R 1/076 |
| | | | | 359/841 |
| 2017/0368996 A1* | 12/2017 | Eto | ............... | F16F 15/08 |
| 2018/0281683 A1* | 10/2018 | Motomiya | ............... | B60R 1/074 |
| 2018/0345863 A1* | 12/2018 | Bouaziz | ............... | G02B 7/182 |

* cited by examiner

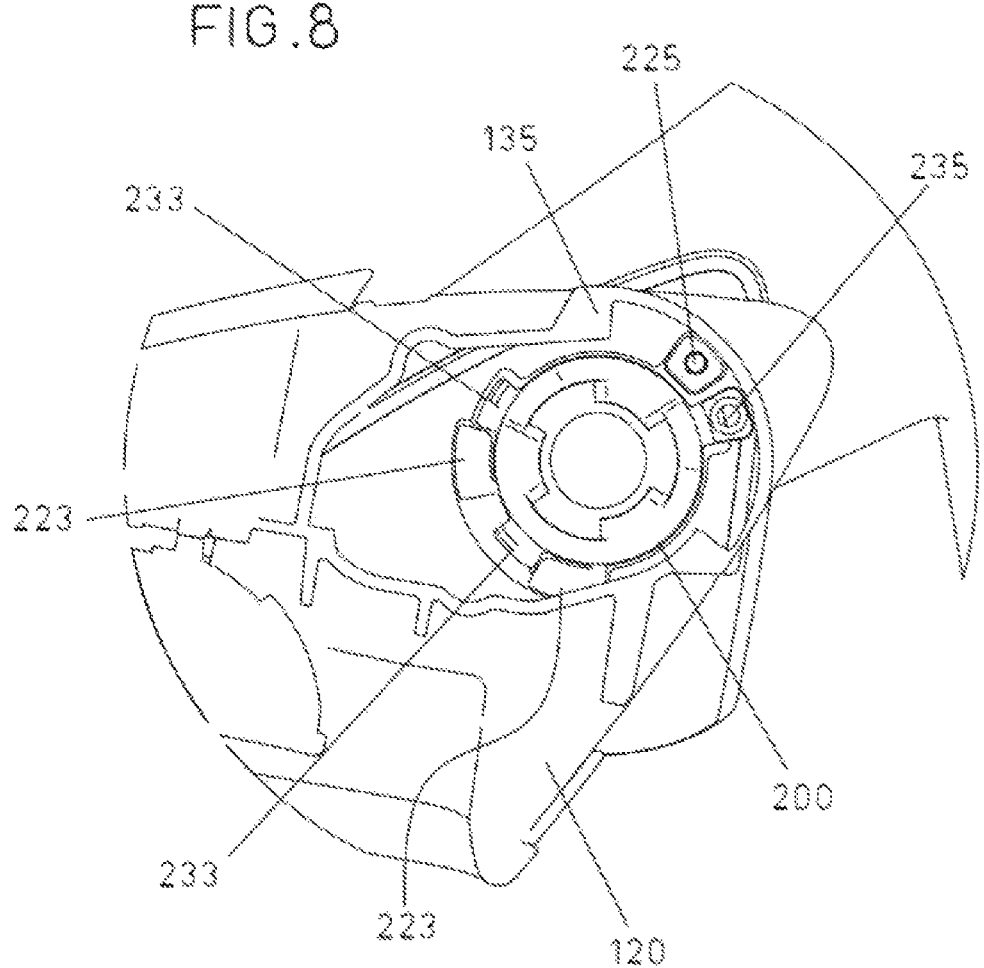

CONNECTOR ARRANGEMENT FOR A MOTOR VEHICLE REAR-VIEW MIRROR

CROSS-REFERENCES TO RELATED APPLICATIONS

This application claims the benefit of European Application 18382081.0, filed on Feb. 13, 2018, which is incorporated herein by reference in its entirety.

The present disclosure relates to rear-view mirrors for motor vehicles. More specifically, the present disclosure relates to a connector arrangement for a rear-view mirror. The present disclosure further relates to a method for assembling such rear-view mirror.

BACKGROUND

Rear-view mirrors for motor vehicles are known in the art comprising a mirror head carrying a mirror housing and a mirror head support. A base bracket is also provided to be fixedly attached to the motor vehicle. The mirror head is mounted to the fixed base bracket through the mirror head support.

In foldable rear-view mirrors, for example, mirror head support is rotatable mounted to the base bracket such that the mirror head coupled thereto is capable of being positioned at least in a first, drive angular position where the rear-view mirror projects from the vehicle body, and a second, folded or parking angular position where the rear-view mirror is folded towards the vehicle body.

Coupling of the mirror head support to the base bracket is commonly carried out either through a bayonet connectors or through screw connectors.

Bayonet connectors generally comprise a first cylindrical part provided with one or more radial pins, and a second cylindrical part with matching slots where pins are allowed to slide. A spring may be provided to keep the cylindrical parts locked together.

One example of the use of bayonet connectors in rear-view mirrors is disclosed in document U.S. Pat. No. 7,546,997. This document discloses a foldable rear-view mirror having a mirror head support and a base bracket coupled together through a connector arrangement. In the foldable rear-view mirror described in this document, the connector arrangement is configured such that in a first angular position, the mirror head support can be displaced along an axis in an insertion direction towards the base bracket such that pins and slots in the mirror head support are brought into engagement so as to axially lock the mirror head support to the base bracket. The mirror head support and the base bracket are further provided with cooperating blocking means which in a second angular position to restrain the mirror head support from rotating to the base bracket. Axial locking of the mirror head support to the base bracket in a direction opposite to the insertion direction is carried out through cooperation of said pins and slots in the mirror head support.

The above known foldable rear-view mirror is intended for avoiding the use of screws for connecting the mirror head support with the base bracket for the purpose of reducing the number of mounting operations, and avoiding the steps of forming a threaded hole. However, this has the disadvantage that the mirror head support with the mirror head can be relatively easily decoupled from the base bracket so that the rear-view mirror can be removed from the car by unauthorized persons with relatively little effort.

The use of screw connections in rear-view mirrors for motor vehicles for the purpose of coupling of the mirror head to the base bracket is commonly used in the motor vehicles sector. Screws are inserted from the base bracket towards the mirror head, that is, from bottom to top, into threaded holes formed both in the mirror head and in the base bracket.

The use of screw connections allows mounting operations to be facilitated and costs to be reduced. This however has the disadvantage that the operator has to gain access to the lower part of the base bracket for assembling operations. Since the base bracket is often covered by a cover, this should have a releasable window in the lower part thereof in order to provide said access to fit the screw. This renders assembly operations complex and costly.

SUMMARY

A connector arrangement for a motor vehicle rear-view mirror is presented with which the above disadvantages are overcome and by means of which further advantages are obtained.

The present connector arrangement comprises a base bracket and a mirror head support. The base bracket is intended to be fixedly attached to a motor vehicle such as for example externally in a motor vehicle body. The mirror head support is arranged to be mounted to the base bracket. In use, the mirror head support carries a mirror head that includes a mirror housing for receiving a mirror pane therein. The present connector arrangement further includes a coupling member for coupling the mirror head support to the base bracket. The coupling member may be an integral part of the mirror head support. The coupling member and the base bracket define a bayonet type connector, that is, the coupling member is coupled to the base bracket by rotating the former to the latter until the coupling member is axially retained to the base bracket.

In the case of a foldable rear-view mirror, an electric actuator is provided for driving the mirror head support, and thus the mirror head with the mirror housing, in rotation for the purpose of arranging the rear-view mirror at least in a first, drive angular position where the rear-view mirror projects from the vehicle body, and a second, folded or parking angular position where the rear-view mirror is folded towards the vehicle body. In such foldable rear-view mirrors, the coupling member is configured for rotatably coupling the mirror head support to the base bracket for obtaining the above angular positions of the rear-view mirror.

The connector arrangement includes at least one first portion and at least one second portion. The least one first portion is formed in or attached to the coupling member, and the at least one second portion is formed in or attached to the base bracket. Said first and second portions are configured for insertion therein of at least one fixing member, e.g. a screw, towards the base bracket, usually from top to bottom, for retaining the coupling member to the base bracket against rotation.

In one particular example, the first portion in the coupling member is arranged radially extending therefrom and includes a hole that may, for example, be a threaded hole. The second portion in the base bracket may include a hole that may, for example, be a threaded hole.

Once the fixing member is inserted in both first and second portions, the coupling member is retained to the base bracket against rotation. In the above example for foldable rear-view mirrors, in one assembled condition, with the coupling member attached to the base bracket, the mirror head support can be rotated to the base bracket.

A first cover may be provided arranged between the base bracket and the mirror head support. The first cover may preferably include at least one lip protruding therefrom towards the mirror head support. As a result, the lip allows noise to be avoided or at least to be reduced which may be produced by gaps existing inside the rear-view mirror such as for example between the base bracket and the mirror head.

At least one of the first portion or the second portion may be raised from a bottom of the coupling member or from the base bracket. If the coupling member was on the same plane as the base bracket, it would collide with the lip as the mirror head is folded, since the mirror head base is not circular. The lip is thus shaped so as to follow the shape of the at least one portion of a mirror head base in order advantageously avoid interferences.

In order to optimize the design of the coupling member, and not to increase the height of the mirror head, at least one of the first and second portions, and preferably the first portion, has one inclined end surface. Such inclined end surface is intended to abut a corresponding inclined end surface formed in the other of the first and second portions. In one example, the inclined end surface of the first portion matches that of the second portion so as to rest on one another.

Since the first portion is raised from a coupling member base the height of the mirror head is advantageously increased with respect to the case where the first portion is formed at the same level that the coupling member base. Thus the height of mirror head is not required to be increased. A greater surface is thus obtained between the first portion and the coupling member base so that strength is increased.

A rear-view mirror for motor vehicles is also provided herein comprising the connector arrangement described above. The rear-view mirror further includes a mirror head arranged surrounding the connector arrangement and intended for carrying a mirror housing that is configured for receiving a mirror pane.

In the present rear-view mirror, above mentioned first and second portions formed in or attached to the coupling member and the base bracket respectively, serve the purpose of attaching the coupling member to the base bracket against rotation and also to act as mechanical stopper since the first and second portions are capable of abutting on a projecting member that is formed in the mirror head. This configuration allows a folding angle of the mirror head to be limited.

A third cover may be provided for covering the mirror head once the fixing member is inserted in the above mentioned holes formed in first and second portions.

It may be preferred that the mirror head includes a space suitable for inserting a tool towards the base bracket for applying the fixing member, e.g. a screw, so as to conveniently attach the coupling member to the base bracket. A tool can be therefore inserted from top to bottom for conveniently attaching the coupling member to the base bracket retained against rotation. This is in contrast with prior art arrangements where attachment is carried out from bottom to top, that is, towards the mirror head support. Also in the present arrangement, the tool inserting space is arranged such that said tool is allowed to be placed outside the mirror head support at a certain height from the above mentioned lip in the first cover with the overall size of the head mirror volume being unaffected. When such tool inserting space is provided, the third cover may be configured for at least covering said space.

Adjusting means may be preferred to be also provided suitable for adjusting the position of the mirror head relative to the base bracket. When the mirror head is mounted to the base bracket through the mirror head support, the adjusting means prevent the mirror head from becoming displaced away from the base bracket due to the action of a spring that is usually provided therein.

In one example, the coupling member may comprise a base portion and a shaft portion projecting therefrom. The base portion may include radial projections radially projecting therefrom intended to be inserted into corresponding channels formed in the base bracket. Thus, the radial projections of the coupling member and said corresponding channels of the base bracket define a bayonet connector for coupling the mirror head support to the base bracket.

The above adjusting means may include an adjustment washer suitably configured to be fitted to the coupling member shaft portion. Said washer is configured to have a raised upper portion intended to abut an element of the mirror head support for the purpose of reliably adjusting the position of the mirror head relative to the base bracket, preventing an excessive displacement of the mirror head away from the base bracket due to the spring action of said spring.

In foldable rear-view mirrors, the mirror head support may be attached to or be part of a housing for receiving an actuator such as an electric motor to drive the mirror head in rotation at least in the above mentioned angular positions.

A method for assembling the above described rear-view mirror is also provided. In general, the present assembling method comprises mounting a mirror head support to a coupling member, and attaching the coupling member to the base bracket by rotating the former to the latter until radial projections formed therein become fitted into corresponding grooves formed in the base bracket. At least one fixing member, e.g. a screw, is inserted towards the base bracket, such as in a downward direction, through both the mirror head support and the base bracket so that it is screwed therein. As a result, the connector arrangement and the base bracket are fixed against rotation.

A least one of a first or second covers may be mounted on the base bracket and a third cover for covering the mirror head once the fixing member has been fitted.

An improved design for a rear-view mirror is provided that may be securely attached to the vehicle such that it can not be easily removed from the vehicle by unauthorized persons, making it necessary to use a tool for removal of the mirror head. Furthermore, the fixing member performs a dual function, namely attaching the mirror head support to the base bracket and also acting as a mechanical stopper in foldable rear-view mirrors to limit a mirror housing folding angle.

Additional objects, advantages and features of examples of the present connector arrangement for a motor vehicle rear-view mirror will become apparent to those skilled in the art upon examination of the description, or may be learned by practice thereof.

BRIEF DESCRIPTION OF THE DRAWINGS

One particular example of the present connector arrangement for a motor vehicle rear-view mirror will be described in the following, with reference to the appended drawings.

In the drawings:

FIG. 8 is a top plan view of the rear-view mirror shown in FIG. 3.

DETAILED DESCRIPTION OF EXAMPLES

A non-limiting example of the present rear-view mirror for motor vehicles 100 is described having an improved connector arrangement 200 as it will be described in detail hereunder.

Figure 1:
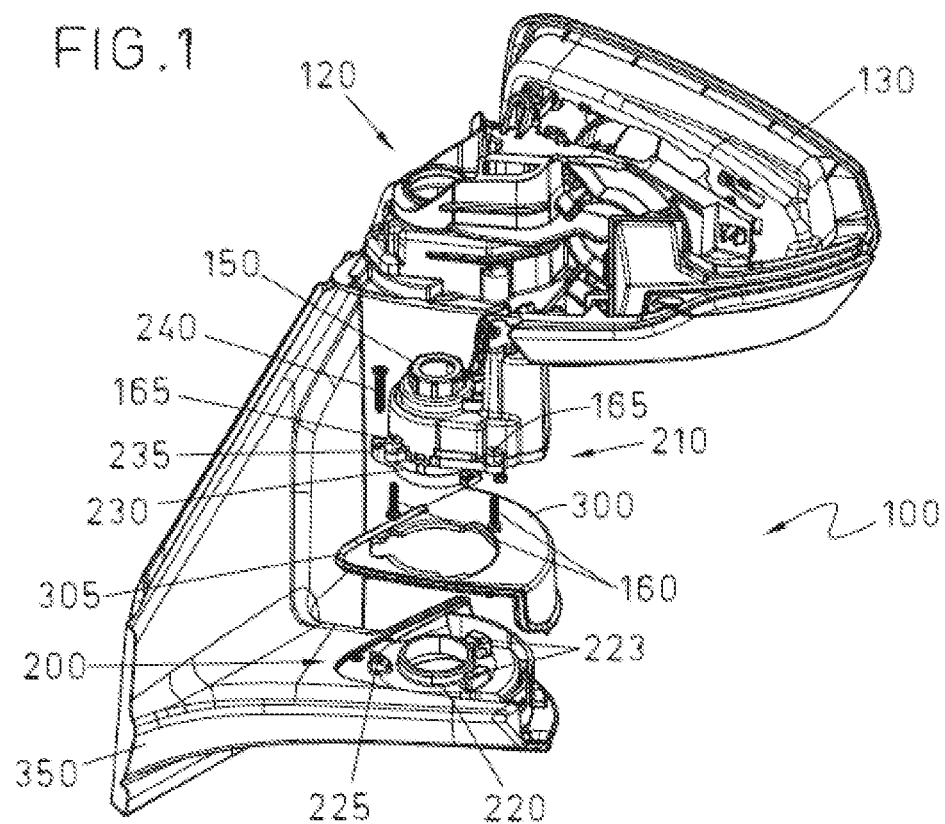
FIG. 1 is a rear exploded perspective view of a foldable rear-view mirror for motor vehicles.
Figure 2:
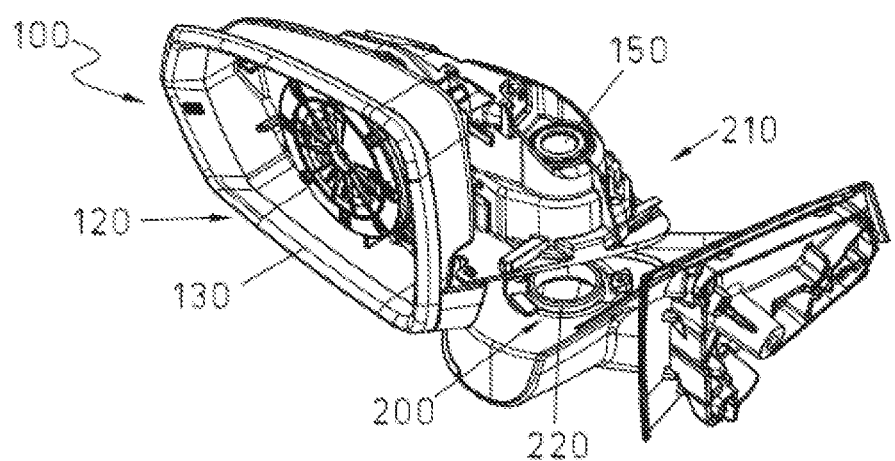
FIG. 2 is a front perspective view of the rear-view mirror shown in FIG. 1.
Figure 3:
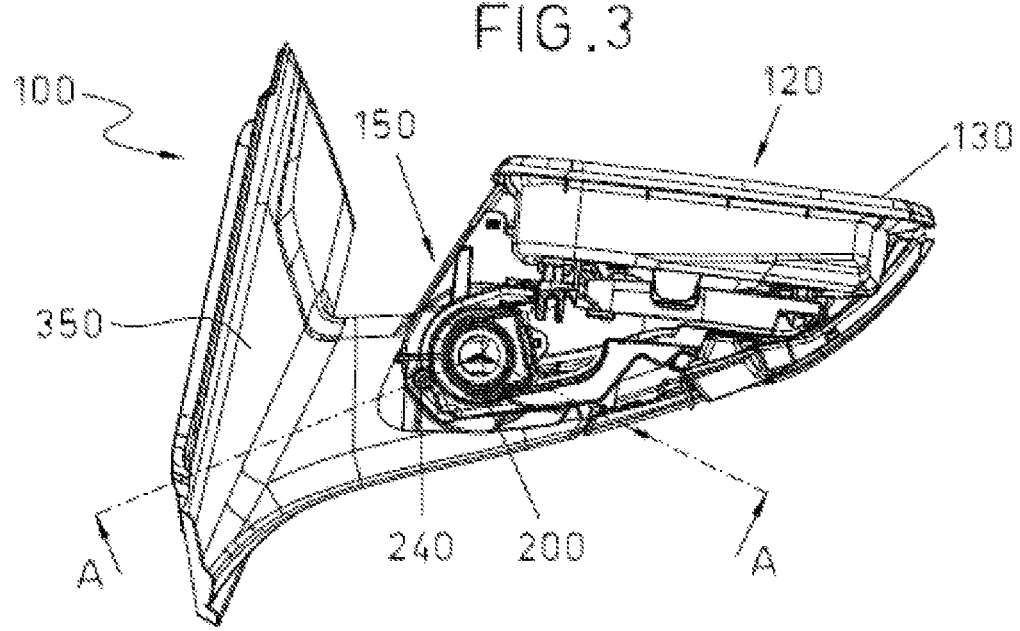
FIG. 3 is a top perspective view of the rear-view mirror shown in FIGS. 1 and 2.
Figure 4:
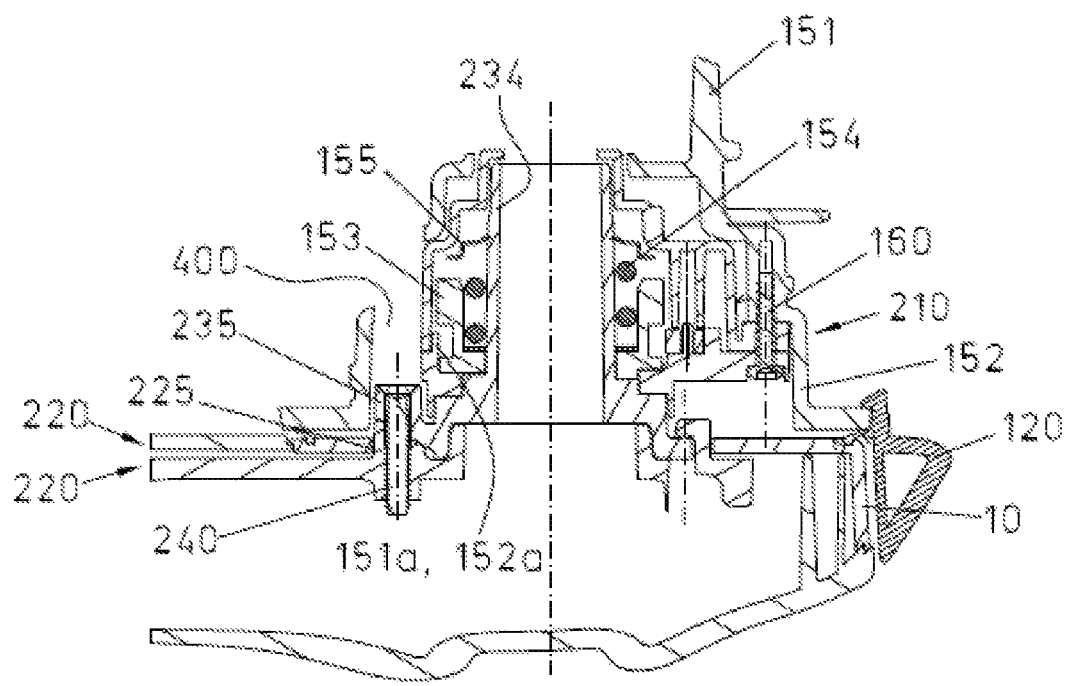
FIG. 4 is a cross-sectional sectional view taken along line AA in FIG. 3.

The rear-view mirror 100 in the example shown is a foldable rear-view mirror. It comprises a mirror head 120 carrying a mirror housing 130 suitable for receiving a mirror pane (not illustrated), as shown in FIGS. 1-3. The mirror head 120 is arranged surrounding a connector arrangement 200 and, together with the mirror housing 130, is pivotable relative to a fixed part of a vehicle body. Pivotal movement of the mirror head 120 is carried out by a powerfold actuator 150 that comprises an electric actuator or motor (not shown) received into a motor housing formed of a top half housing 151 and a bottom half housing 152. The top half housing 151 and the bottom half housing 152 are attached to each other through attaching flanges 152a formed in the bottom half housing 152 adapted to be inserted into corresponding recesses 151a formed in the top half housing 151. When the half housings 151, 152 are coupled to each other via the attaching flanges 151a fitted into the recesses 152a, a receptacle 158 for receiving the electric motor (not shown) is defined as illustrated in FIG. 6.

Coupling portions 165 are provided in both the top half housing 151 and the bottom half housing 152 for coupling the powerfold actuator 150 to the mirror head 120, through corresponding screws 160, so as to rotate together when in use.

Figure 6:
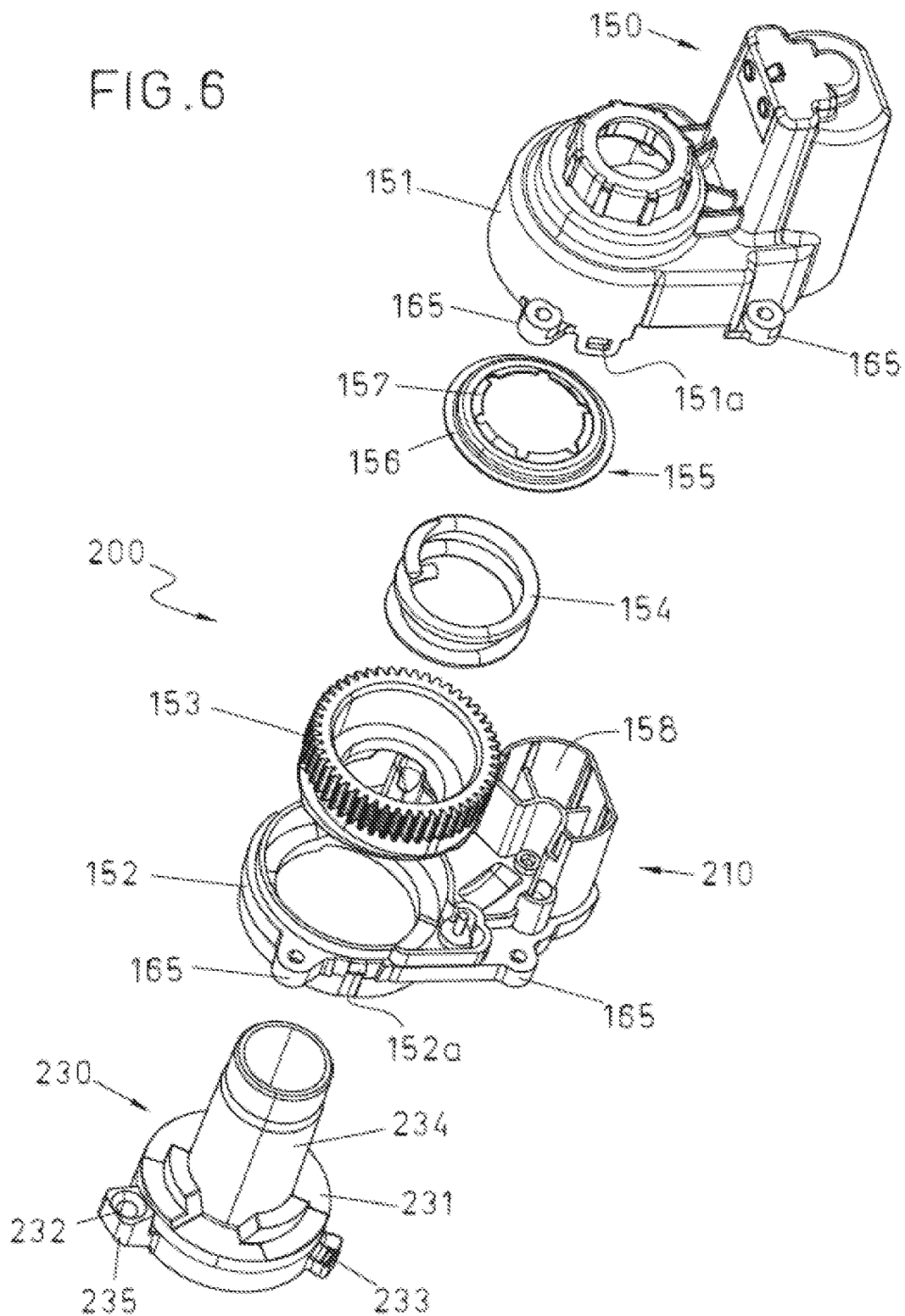
FIG. 6 is an exploded perspective view of the mirror head support attached to a motor housing shown in FIGS. 1-3.

Referring now to FIG. 6 of the drawings, the motor housing 151, 152 is adapted to receive therein a ring gear 153, a compression spring 154, an adjustment washer 155, and the electric motor, not shown, for driving the mirror head 120 in rotation for the purpose of arranging mirror housing 130 into said drive position or said parking position as described above.

The motor housing 151, 152 is part of a mirror head 120. The mirror head 120 is attached to a mirror head support 210 which in turn is rotatably mounted to a base bracket 220. The base bracket 220 is fixedly attached to said fixed part of the vehicle body.

A coupling member 230 is provided, as shown in FIG. 6, for rotatably coupling the mirror head support 210 to the base bracket 220. The mirror head support 210, the base bracket 220 and the coupling member 230 are part of the present connector arrangement 200.

The ring gear 153 is attached against rotation to a shaft portion 234 of the coupling member 230 that will be described below. The ring gear 153 is arranged to mesh with a motor driving shaft, not shown. As the motor driving shaft is driven by the above mentioned electric motor, and since the ring gear 153 is in turn attached to the shaft portion 234, that is fixed, the mirror head 120 with the motor housing 151, 152 is driven in rotation against the compression force applied by the spring 154 to the base bracket 220. The mirror head 120 is then capable of being positioned at least in said angular positions.

The coupling member 230 is arranged for rotatably coupling the mirror head support 210 to the base bracket 220 as described above and referring to this particular non-limiting example of a foldable rear-view mirror. In other types of mirrors, the coupling member 230 may be arranged for fixedly coupling the mirror head support 210 to the base bracket 220.

The coupling member 230 comprises a base portion 231 and the above mentioned shaft portion 234. The shaft portion 234 is formed projecting from the base portion 231 as shown in FIG. 6. Radial projections 233 are formed radially projecting from the base portion 231 of the connector arrangement 200 so as to be inserted into corresponding channels formed in the base bracket 220 as shown in FIG. 1 thus defining the above mentioned bayonet connector. The radial projections 233 of the coupling member 230 and the corresponding channels of the base bracket 220 define a bayonet connector.

Figure 5:
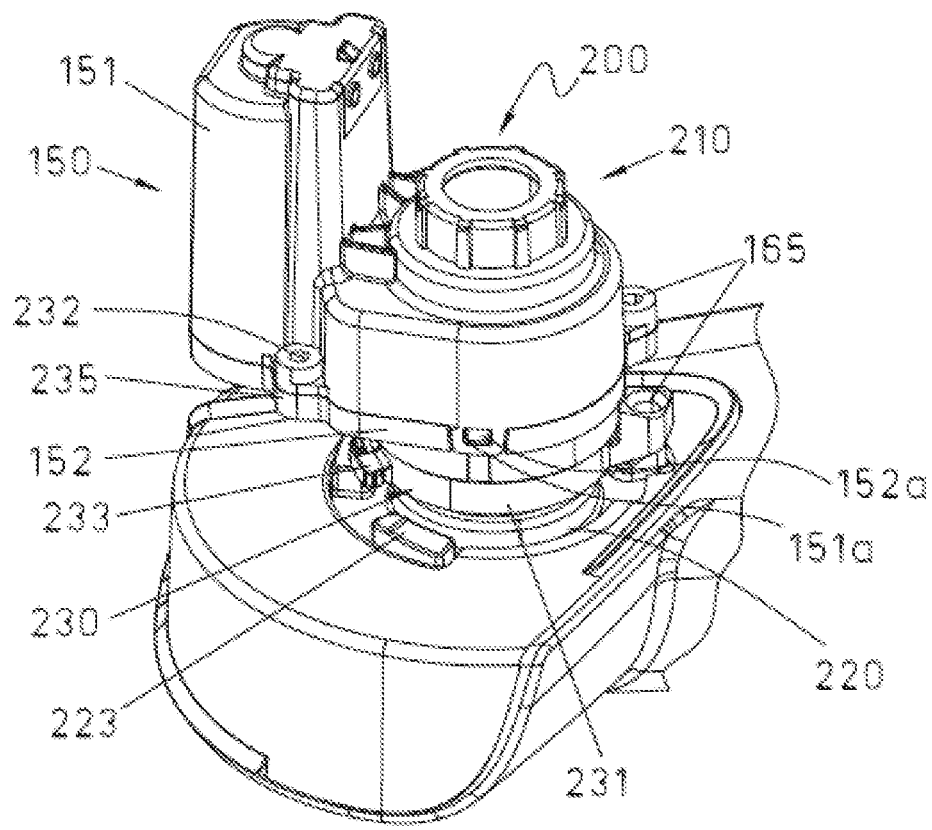
FIG. 5 is a perspective view of the mirror head support attached to a motor housing of the rear-view mirror shown in FIGS. 1-3.

Referring again to FIG. 6, a first portion 235 is formed in the connector arrangement 200 projecting radially outwards therefrom. A corresponding second portion 225 is formed in the base bracket 220 projecting outwards therefrom as shown in FIG. 5. Holes are respectively formed in said first and second portions 235, 225 for receiving a fixing screw 240 passing therethrough. In the example shown, at least one of the holes is threaded. Other examples where none of the holes is threaded are also possible. In such cases, nuts can be then used to be screwed onto the screw.

In this way, once the fixing screw 240 is screwed by inserting it into said threaded holes from top to bottom in the figures, that is, downwardly towards the base bracket 220, the coupling member 230 becomes retained in the base bracket 220 such that it can not be rotated. In turn, the mirror head support 210, with the motor housing 151, 152 of the powerfold actuator 150, the mirror head 120 and the mirror housing 130, are rotatably coupled to the coupling member 230. As a result, the present foldable rear-view mirror can be positioned at least in the above mentioned angular positions but can not be detached from the vehicle easily.

The first and second portions 235, 225 serve the purpose of attaching the coupling member 230, and thus the mirror head support 210, to the base bracket 220. It is to be noted that the first and second portions 235, 225 also performs an additional mechanical stopper function. The first and second portions 235, 225 are capable of abutting on a projecting member 135 formed in the mirror head 120, as shown in FIG. 8, so as to limit a folding angle of the mirror head 120.

Figure 7:
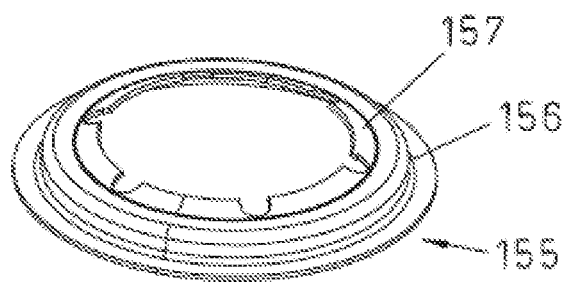
FIG. 7 is a perspective view showing an adjustment washer as part of the means for adjusting the position of the mirror head relative to the base bracket.

Referring now to FIG. 7, the adjustment washer 155 comprises a washer base 156 with a raised double-roof shaped upper portion 157. Said upper portion 157 is arranged to be secured to the shaft portion 234 of the coupling member 230 and to abut a upper portion of above mentioned spring 154. The washer base 156 is intended to abut a upper portion of the ring gear 153. The so configured adjustment washer 155 allows the position of the mirror head 120 to be adjusted relative to the base bracket 220, as described above. This prevents an excessive displacement of the mirror head 120 from occurring away from the base bracket 220 due to the action of the compression spring 154 and the abutment between the washer base 156 and the upper portion of the ring gear 153. The powerfold actuator 150 is thus rotatably coupled to the coupling member 230 through the ring gear 153 that is secured to the shaft portion 234 of the coupling member 230, as stated above.

Between the base bracket 220 and the mirror head support 210 a first cover 300 is provided, as shown in FIG. 1 of the drawings. The first cover 300 includes a lip 305 that projects upwards therefrom towards the mirror head support 210. Also, a second cover 350 is provided onto the base bracket 220.

A space suitable for inserting a tool (not shown) towards the base bracket 220 for fixing the fixing screw 240 is formed within the mirror head 120 as shown in FIG. 3 where a portion 400 of such space is shown. Said tool inserting space allows a suitable tool to be used for attaching the coupling member 230 to the base bracket 220 by screwing the fixing screw 240 from top to bottom, that is, in a direction towards the base bracket 220. A third cover may be provided in the mirror head 120 for covering said tool inserting space in the mirror head 120 once the fixing screw 240 has been fitted.

The rear-view mirror 100 is assembled by providing a base bracket 220 fixedly attached to the motor vehicle body, mounting a second cover or bezel 350 on the base bracket 220, mounting a first cover 300 thereon and then rotatably mounting the mirror head support 210 to the base bracket 220 through the coupling member 230. This is carried out by rotating the coupling member base portion 231 until mirror head support radial projections 233 are conveniently fitted into corresponding grooves 223 in the base bracket 220. Then, a fixing screw 240 is inserted downwardly towards the base bracket 220 through the at least one threaded hole, formed in the coupling member 230 and the base bracket 220 respectively. The coupling member 230 and the base bracket 220 are thus fixed to each other such that they can neither be moved axially, nor rotated with respect to each other. The mirror head 120 with the mirror head support 210 are rotatably coupled to the coupling member 230, in the example shown of a foldable rear-view mirror. A third cover may be fitted for covering the mirror head once the fixing member has been fitted with the purpose of covering the space for inserting the tool.

Although only a number of particular embodiments and examples of the present connector arrangement for a motor vehicle rear-view mirror have been disclosed herein, it will be understood by those skilled in the art that other alternative examples and/or uses and obvious modifications and equivalents thereof are possible. For example, although in the example describe above a fixing screw is used for fastening the coupling member to the base bracket against rotation, other fixing means such as a pin, a bolt, and the like can be alternatively used.

The present disclosure thus covers all possible combinations of the particular examples described. The scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A connector arrangement for a motor vehicle rear-view mirror, the connector arrangement comprising:
    a bayonet connector including a coupling member having a first portion, and a base bracket having a second portion and adapted to attach to the motor vehicle;
    a mirror head support mounted to the base bracket, the coupling member being engaged to the mirror head support and the base bracket; and
    a fixing member located in the first and second portions and adapted to be inserted into the second portion from the first portion and towards the base bracket preventing rotation of the coupling member with respect to the base bracket and about a center axis, wherein the fixing member is a screw projecting through and outward from the first portion for threadable engagement into the second portion, wherein the first portion projects radially outward from a base portion of the coupling member that extends circumferentially, and the second portion is spaced radially outward from the center axis and projects axially upward, wherein the first portion is located axially above the base portion of the coupling member.

2. The connector arrangement set forth in claim 1, further comprising:
    a first cover arranged axially between the base bracket and the mirror head support, the first cover including at least one lip projecting axially upwards towards the mirror head support.

3. The connector arrangement set forth in claim 1, wherein the first portion includes an inclined end surface abutting an inclined end surface of the second portion.

4. The connector arrangement set forth in claim 3, wherein the inclined end surface of the first portion matches that of the inclined end surface of the second portion, and the inclined end surfaces are inclined with respect to a center axis.

5. The connector arrangement set forth in claim 1, wherein the second portion is located axially above a bottom of the coupling member.

6. The connector arrangement set forth in claim 1, wherein the mirror head support is mounted to the base bracket for rotation about the center axis.

7. A motor vehicle rear-view mirror comprising:
    a connector arrangement including:
        a bayonet connector including a coupling member having a first portion, and a base bracket having a second portion and adapted to attach to the motor vehicle,
        a mirror head support mounted to the base bracket, the coupling member being engaged to the mirror head support and the base bracket, and
        a fixing member located in the first and second portions and constructed to be inserted through the first portion and into the second portion towards the base bracket preventing rotation of the coupling member with respect to the base bracket and about a center axis;
    a mirror head surrounding and supporting the connector arrangement; and
    a mirror housing carried by the mirror head, wherein the first portion is located axially above a base portion of the coupling member, and the base portion extends circumferentially.

8. The motor vehicle rear-view mirror set forth in claim 7, wherein the mirror head includes a radially projecting member adapted to circumferentially abut at least one of the first and second portions as the mirror head is rotated limiting a folding angle of the mirror head.

9. The motor vehicle rear-view mirror set forth in claim 8, further comprising:
a space defined by the mirror head and over the fixing member for insertion of a tool to attach the fixing member during assembly.

10. The motor vehicle rear-view mirror set forth in claim 7, wherein an access portion in the connector arrangement is adapted for access to the screw.

11. A connector arrangement for a motor vehicle rear-view mirror, the connector arrangement comprising:
a bayonet connector including a coupling member having a first portion, and a base bracket having a second portion and adapted to attach to the motor vehicle;
a mirror head support mounted to the base bracket, the coupling member being engaged to the mirror head support and the base bracket; and
a fixing member located in the first and second portions and adapted to be inserted into the second portion from the first portion and towards the base bracket preventing rotation of the coupling member with respect to the base bracket and about a center axis, wherein the fixing member is a screw projecting through and outward from the first portion for threadable engagement into the second portion, and wherein the mirror head support includes a space suitable for inserting a tool towards the base bracket for applying the fixing member, wherein the first portion projects radially outward from a base portion of the coupling member, the base portion extends circumferentially, and the first portion is located axially above the base portion of the coupling member.

* * * * *